United States Patent
Salehi et al.

(10) Patent No.: US 9,213,575 B2
(45) Date of Patent: Dec. 15, 2015

(54) METHODS AND SYSTEMS FOR ENERGY MANAGEMENT IN A VIRTUALIZED DATA CENTER

(71) Applicant: Infosys Limited, Bangalore (IN)

(72) Inventors: Mohsen Amini Salehi, Melbourne (AU); Raj Kumar Buyya, Melbourne (AU); Krishnamurty Sai Deepak, Bangalore (IN); Radha Krishna Pisipati, Hyderabad (IN)

(73) Assignee: Infosys Limited, Bangalore (IN)

( * ) Notice: Subject to any disclaimer, the term of this patent is extended or adjusted under 35 U.S.C. 154(b) by 199 days.

(21) Appl. No.: 13/924,161

(22) Filed: Jun. 21, 2013

(65) Prior Publication Data

US 2014/0380304 A1    Dec. 25, 2014

(51) Int. Cl.
G06F 9/50 (2006.01)
G06F 9/455 (2006.01)

(52) U.S. Cl.
CPC .............. *G06F 9/50* (2013.01); *G06F 9/45558* (2013.01); *G06F 2009/4557* (2013.01)

(58) Field of Classification Search
CPC ................................................. G06F 9/45533
USPC ............................................................ 718/1
See application file for complete search history.

(56) References Cited

U.S. PATENT DOCUMENTS

| | | | |
|---|---|---|---|
| 2005/0226163 A1* | 10/2005 | Ramanathan et al. | ........ 370/241 |
| 2010/0050172 A1 | 2/2010 | Ferris | |
| 2011/0138034 A1 | 6/2011 | Brookbanks et al. | |
| 2011/0145153 A1 | 6/2011 | Dawson et al. | |
| 2011/0145413 A1 | 6/2011 | Dawson et al. | |
| 2011/0154350 A1 | 6/2011 | Doyle et al. | |
| 2011/0231899 A1 | 9/2011 | Pulier et al. | |
| 2011/0246653 A1 | 10/2011 | Balasubramanian et al. | |
| 2012/0022910 A1 | 1/2012 | Chi et al. | |
| 2012/0327779 A1* | 12/2012 | Gell et al. | ..................... 370/238 |
| 2013/0014107 A1* | 1/2013 | Kirchhofer | ...................... 718/1 |
| 2013/0246105 A1* | 9/2013 | Winkler et al. | .............. 705/7.11 |
| 2013/0283373 A1* | 10/2013 | Zisapel et al. | .................. 726/22 |

OTHER PUBLICATIONS

Salehi et al. "Resource provisioning based on lease preemption in InterGrid." Proceedings of the Thirty-Fourth Australasian Computer Science Conference—vol. 113. Australian Computer Society, Inc., 2011).*

(Continued)

*Primary Examiner* — Adam Lee
*Assistant Examiner* — Charlie Sun
(74) *Attorney, Agent, or Firm* — Klarquist Sparkman, LLP

(57) ABSTRACT

A method and system provisions a plurality of resources of a data center. A violation risk factor for a set of low priority requests can be computed. A utilization factor of a set of activated resources of the data center shall be evaluated. According to a predefined rule base, one or more of the plurality of resources, shall be provisioned for a received high priority request, whereby the predefined rule base defines performing one or more of; a) preempting a set of virtual machines utilizing a subset of the set of activated resources, whereby the set of virtual machines is associated with the set of low priority requests; b) activating a new set of resources; and c) consolidating a plurality of virtual machines, based on the computed violation risk factor and the evaluated utilization factor.

29 Claims, 5 Drawing Sheets

(56) References Cited

OTHER PUBLICATIONS

Salehi et al., "Contention-aware Resource Management System in a Virtualized Grid Federation." student research symposium of 17th IEEE International Conference on High Performance Computing (HiPC '11), India, 2011.*

Leung et al., "Platform PreEmption Management Solution," *A Technology Whitepaper*, Apr. 2009, 18 pages.

Salehi et al., "Preemption-aware Energy Management in Virtualized DataCenters," *2012 IEEE 5$^{th}$ International Conference on Cloud Computing (CLOUD)*, Jun. 24, 2012, 8 pages.

Sotomayor et al., "An Open Source Solution for Virtual Infrastructure Management in Private and Hybrid Clouds," *IEEE Internet Computing, Special Issue on Cloud Computing*, Jul. 2009, 11 pages.

\* cited by examiner

A set of rules of a Predefined Rule Base of a Fuzzy Engine

| Rule Number | Violation Risk Factor | Utilization Factor | Output of Fuzzy Engine |
|---|---|---|---|
| 1 | LR | VL | HC |
| 2 | LR | L | HC |
| 3 | LR | M | MC |
| 4 | LR | H | LC |
| 5 | LR | VH | AP |
| 6 | MR | VL | MC |
| 7 | MR | L | LC |
| 8 | MR | M | LC |
| 9 | MR | H | HP |
| 10 | MR | VH | 3QP |
| 11 | HR | VL | HP |
| 12 | HR | L | HP |
| 13 | HR | M | QP |
| 14 | HR | H | QP |
| 15 | HR | VH | NP |
| 16 | VHR | VL | QP |
| 17 | VHR | L | QP |
| 18 | VHR | M | NP |
| 19 | VHR | H | NP |
| 20 | VHR | VH | NP |

FIG. 4

METHODS AND SYSTEMS FOR ENERGY MANAGEMENT IN A VIRTUALIZED DATA CENTER

FIELD

The present invention relates generally to a method and system for energy management in a virtualized data center. More specifically, the present invention relates to a method and system for dynamic provisioning of resources in the virtualized data center.

BACKGROUND

Current trend in data centers is a growing awareness on energy consumption and a search for energy efficient solutions that keep in view user required performance and various service level agreements (SLA). Efficient resource management policies, in particular, can significantly reduce the energy consumption, of the data centers. In existing data centers virtual machine (VM) technology is being used as a unit of resource provisioning. VMs offer flexibilities such as preemption, migration and consolidation in order to implement energy efficient policies.

Further, the data centers support a combination of advance-reservation and best-effort schemes, interactive and batch jobs, tight deadline and loose-deadline jobs. When a shortage of resources such as the virtual machines, exist, commonly, lower priority requests are preempted in favor of a higher priority request. For instance, Haizea, a resource scheduler for virtualized data centers, supports a combination of advance-reservation (AR) and best-effort (BE) requests. In the former, the resources must be available at the requested time, whereas in the latter, requests can be served as soon as possible and are placed in a queue if necessary. The BE requests are usually preempted when an insufficiency of resources exists, for a newly arriving AR request. However, preemption may lead to starvation of the BE requests. In order to prevent such starvation, a limited and predictable waiting time for BE requests, needs to be maintained and monitored, such that the waiting time is not violated for any BE request.

Hence, there is a need for a method and a system that can add a power-awareness capability to the Haizea such that, the arriving AR request is served in manner that shall avoid starvation of the BE requests. The alternate method and system, must preempt the BE requests for serving the arriving AR request, reactivate switched off resources, and alternatively perform VM consolidation to save energy in circumstances that shall avoid starvation of the BE requests. Thus a method and a system for dynamic provisioning of resources in a virtualized data center is proposed.

SUMMARY

The present invention provides a method and system for provisioning a plurality of resources of a data center. In accordance with a disclosed embodiment, the method may include computing a violation risk factor for a set of low priority requests allocated to a data center, and evaluating a utilization factor of a set of activated resources of the data center. Further according to a predefined rule base, one or more of the plurality of resources of the data center, may be provisioned by performing one or more of: a) preempting a set of virtual machines utilizing a subset of the set of activated resources, whereby the set of virtual machines is associated with the set of low priority requests, b) activating a new set of resources, and c) consolidating a plurality of virtual machines, based on the computed violation risk factor and the evaluated utilization factor.

In an additional embodiment, a system for provisioning a plurality of resources of a data center is disclosed. The system comprises a computing engine configured to; compute a violation risk factor of a set of low priority requests. Further, the system includes an energy utilization engine, configured to evaluate a utilization factor of a set of activated resources of the data center. The system further includes a fuzzy engine, configured to, provision according to a predefined rule base, one or more of the plurality of resources for a high priority request, the rule base defining a performing of one or more of: a) preempting a set of virtual machines utilizing a subset of the set of activated resources, whereby the set of virtual machines is associated with the set of low priority requests, b) activating a new set of resources, and c) consolidating a plurality of virtual machines, based on the computed violation risk factor and the evaluated utilization factor.

These and other features, aspects, and advantages of the present invention will be better understood with reference to the following description and claims.

BRIEF DESCRIPTION OF THE DRAWINGS

FIG. 4 illustrates a set of rules of a predefined rule base of a Fuzzy Engine

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-program products for provisioning resources in a virtualized data center. More specifically the methods, and systems disclosed provide a framework for including an energy aware policy mechanism in an energy scheduler for a virtualized data center.

A resource scheduler such as Haizea for a virtualized data center usually supports a combination of advance-reservation (AR) requests and best-effort (BE) requests. The former is usually a request where a resource of the data center must be available at the requested time; whereas the latter are requests which can be placed in a queue and may be served as the resources are available. Thus the AR requests are considered to be high priority request, whereas the BE requests are considered to be low priority requests. The Haizea usually preempts a BE request for an arriving high priority request. However, preemption may lead to starvation of the low priority request. In order to avoid starvation the energy scheduler may consider a limited waiting time for the low priority request. The disclosed method takes into consideration the limited waiting time for the low priority request while provisioning resources for the arriving high priority request. Further, the disclosed method aims to optimize energy consumption within the virtualized data center.

Figure 1:
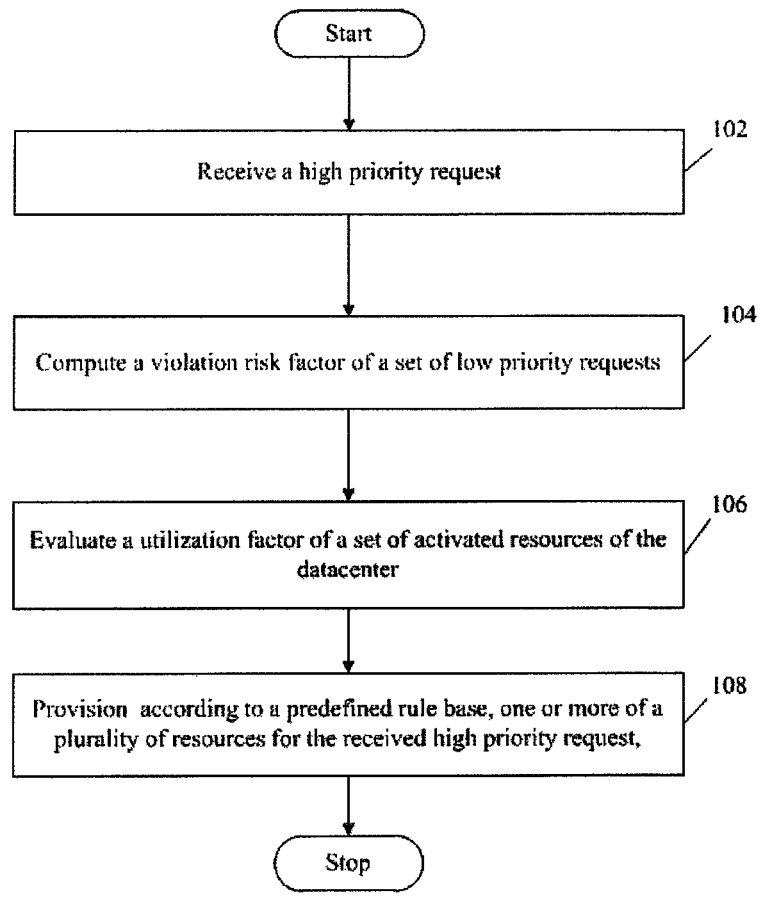
FIG. 1 is a flowchart illustrating an embodiment of a method for provisioning a plurality of resources of a data center.

FIG. 1 illustrates an embodiment of a method of practicing the present invention. At step 102, a high priority request is received by a data center. Further, at step 104, a violation risk factor of a set of low priority request that are being serviced in the data center is computed. The violation risk factor includes a risk of violating a service level agreement of the set of low priority requests. The risk of violating the service level agreement basically includes violating a maximum average waiting time for a plurality of low priority request. The violation risk factor may be computed as a ratio of an average waiting time of the set of low priority requests and a product of an average duration of the set of low priority requests and a waiting factor. The violation risk factor may be defined as:

$$V = \frac{\tau}{\alpha \cdot E} \qquad \text{Equation 1}$$

where, $\alpha$ is the waiting factor determined by a system administrator, E is the average duration of the set of low priority requests, and $\tau$ is the average waiting time of the set of low priority requests. E can be calculated as;

$$E = \frac{\sum_{i=1}^{N} n_i \cdot d_i}{\sum_{i=1}^{N} n_i} \qquad \text{Equation 2}$$

where, N is the number of the set of low priority requests, waiting in the queue, n, is the number of activated resources needed by a low priority request i, and $d_i$ is the duration required by the low priority request i. Also, $\tau$ in Equation 1, the average waiting time of the set of low priority requests can be computed as:

$$\tau = \frac{\sum_{i=1}^{N} n_i \cdot w_i}{\sum_{i=1}^{N} n_i} \qquad \text{Equation 3}$$

where, $w_i$ is the waiting time of the low priority request i. A value of the violation risk factor can range from a zero value to a positive value, whereby the zero value indicates a low risk of violating the maximum average waiting time and a value equal to and greater than one indicates a high risk of violating the maximum average waiting time. The value of the violation risk factor greater than 1, implies that the set of low priority requests are waiting for a time greater than the maximum average waiting time.

Further, at step 106, a utilization factor of a set of activated resources of the data center can be evaluated, where the set of activated resources maybe utilized by a set of allocated requests to the data center. The set of allocation request may include a combination of high priority and low priority requests. The utilization factor is a ratio of a total load on the data center by the set of allocated requests and a product of a latest completion time of the set of allocated requests and a number of the set of activated resources. The utilization factor, C, maybe defined as per Equation 4, as:

$$C = \frac{L}{P \cdot T} \qquad \text{Equation 4}$$

where, P is the number of set of activated resources, T, is the latest completion time of the set of allocated requests, and L, is the total load on the data center. The total load on the data center, L, maybe calculated as:

$$L = \sum_{i=1}^{N} d_i \cdot n_i \qquad \text{Equation 5}$$

The utilization factor, C, may take values from 0 to 1, where, lower values for C indicate, that the set of activated resources are under-utilized, and values of C closer to 1 indicate a high utilization of the set of activated resources of the data center. At step 108, one or more of a plurality of resources for the received high priority request can be provisioned according to a predefined rule base. The predefined rule base defines performing one or more of: step a) preempting a set of virtual machines utilizing a subset of the set of activated resources, whereby the set of virtual machines is associated with the set of low priority requests; step b) activating a new set of resources; and step c) consolidating a plurality of virtual machines, based on the computed violation risk factor and the evaluated utilization factor.

Figure 2:
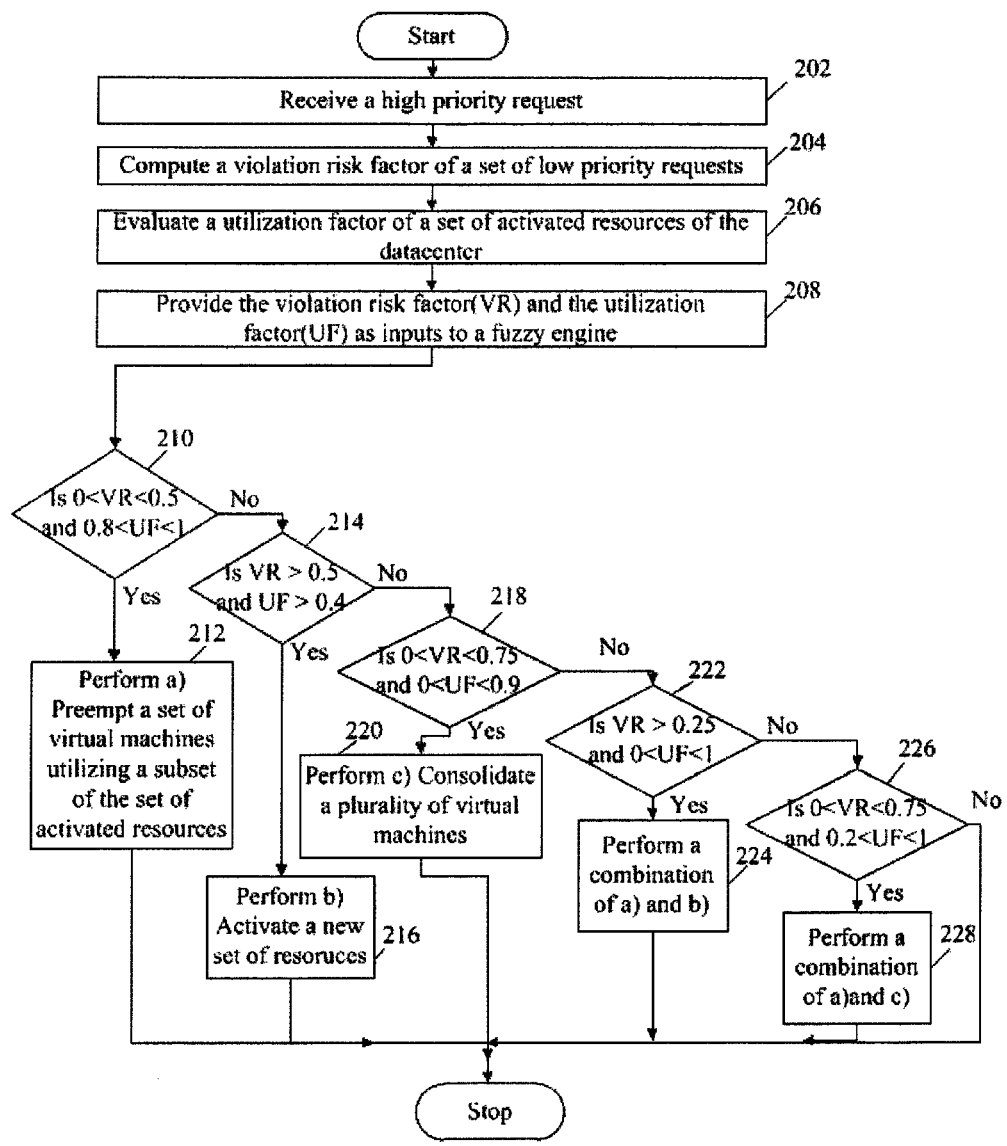
FIG. 2 is a flowchart illustrating an alternate embodiment of a method for provisioning a plurality of resources of a data center.

FIG. 2 illustrates an alternate embodiment of a method of practicing the present invention. At step 202, a high priority request can be received. Further, at step 204, a violation risk factor of a set of low priority requests can be computed. Next at step 206, a utilization factor of a set of activated resources of the data center can be evaluated. The set of activated resources maybe utilized by a set of high priority and a set of low priority requests. The computed violation risk factor (VR) and the evaluated utilization factor (UF) can be provided as inputs to a fuzzy engine at step 208, for provisioning one or more of a plurality of resources of the data center for the received high priority requests. The fuzzy engine may be configured by a predefined rule base for provisioning of resources. A value of the violation risk factor can be classified into one of; a low risk range (LR), a medium risk range (MR), a high risk range (HR) and a very high risk range (VHR); whereas a value of the utilization factor can be classified into one of; a very low (VL), a low (L), a medium (M), a high (H) and a very high (VH). An output D, of the fuzzy engine maybe expressed by a following relation:

$$V \times C \rightarrow D$$

$$V<L,M,H,VH> \times C<VL,L,M,H,VH> \rightarrow D<NP,QP,HP, \\ 3QP,AP,LC,MC,HC> \qquad \text{Equation 6}$$

The input V stands of the violation risk factor and C stands of the utilization factor. The input V can take values from the set (LR, MR, HR, and VHR). LR includes values of V from 0 to 0.5. MR includes values of V from 0.25 to 0.75. HR includes values of V from 0.5 to 1. And VHR includes values of V greater than 0.75. The input C can take values from the set (VL, L, M, H and VH). The value of VL includes a range [0, 0.4]. The value of L includes values from [0.2, 0.5]. M includes values in the range [0.4, 0.8], H includes values in the range [0.5, 0.9], and VH includes values in the range [0.8, 1.0]. The output D basically ranges from NP, QP, HP, 3QP, AP, LC, MC, and HC. NP means no preemption and activating a new set of resources. QP indicates a quartile of requested resources, should be allocated through preemption and a remaining of the requested resources has to be allocated via activating the new set of resources. HP and 3QP mean half preemption and 3 quartile preemption. AP indicates that all resources should be allocated through preemption and that none of the new set of resources shall be activated. Further, LC, MC and HC, indicate a low consolidation, a medium consolidation and a high consolidation of virtual machines of the data center, which shall help in determining a number of resources that can be deactivated.

As the violation risk factor V and the utilization factor C, comprise two inputs to the fuzzy engine having 4 and 5 fuzzy set values each, the predefined rule base comprises of 20 rules. The predefined rule base of the fuzzy engine is illustrated in FIG. 4. For instance a rule 9 of the predefined rule base can be expressed as:

if V is M and C is H then D is HP

The rule 9, basically implies, that if the violation risk factor, V, is M which is in the Medium range and the utilization factor, C, is H, High, then the output of the fuzzy engine D, will HP, half preemption. The output shall indicate that half of a set of resources required for the received high priority request shall be allocated via preemption and the other half shall be allocated via activating new resources. At step 212, output D includes performing step a) preempting a set of virtual machines utilizing a subset of the set of activated resources, whereby the set of virtual machines is associated with the set of low priority requests, when the violation risk factor is the LR range and the utilization factor is in the VH range as per rule 5 of the predefined rule. Step 216, includes performing step b) activating a new set of resources, when V is in the LR and VHR range and C is in the M, H and VH range, as per rule 15,18,19 and 20 of the predefined rule base. At step 218, step c) consolidating a plurality of virtual machines shall be performed when V is in the LR, MR and HR range, and C is in VL, L, M and H range, as per rule 1, 2, 3, 4, 6, 7, and 8. Further a combination of step a) and step b) shall be performed at step 224, as per rule 9, 10, 11, 12, 13, 14, 16 and 17, when V ranges from MR, HR and VHR, and C ranges from VL, L, M, H and VH. Further performing a combination of step a) and step c) when V lies in the range of LR, MR, and HR and C ranges from L, M, H, and VH.

When a low priority request is received by the data center, the low priority request is placed in a queue. One or more resources from the set of activated resources can be allocated to the received low priority request, as soon as the one or more resources is available, where the set of activated resources usually refer to the resources that are utilized by currently executing requests at the data center.

Figure 3:
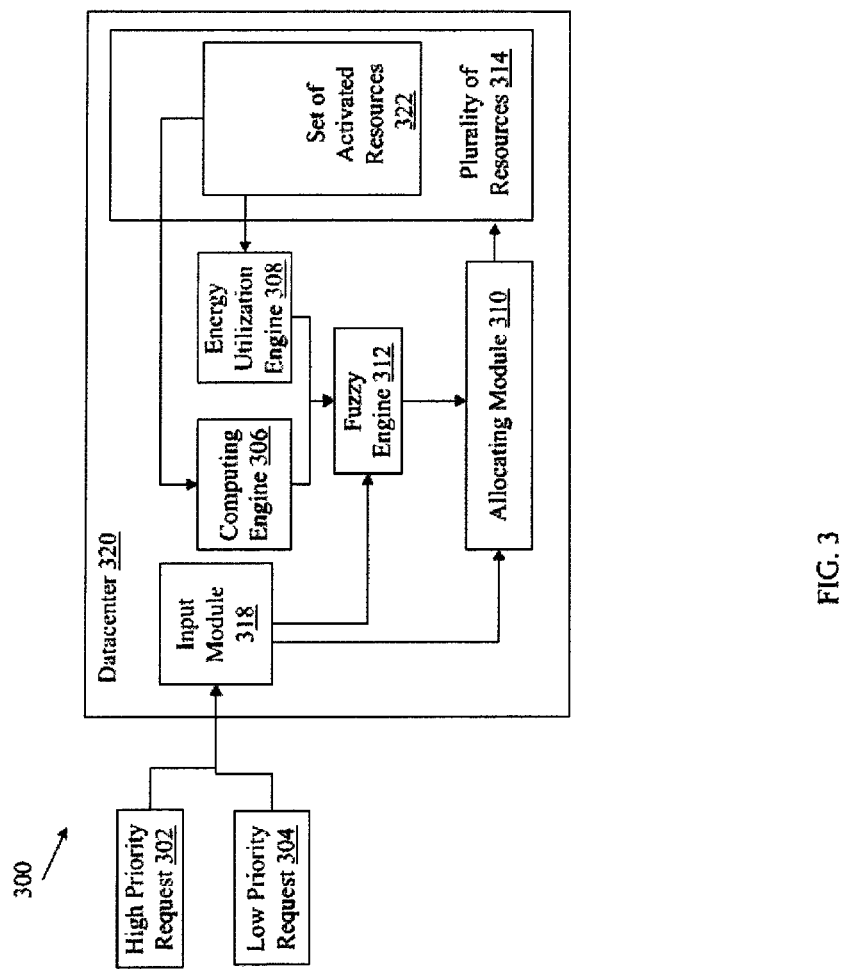
FIG. 3 shows an exemplary system for provisioning a plurality of resources of a data center.

FIG. 3 illustrates an exemplary system 300 in which various embodiments of the invention can be practiced. The exemplary system 300 includes a data center 320, the data center 320, including an input module 318, a computing engine 306, an energy utilization engine 308, an allocating module 310, and a fuzzy engine 312. The data center 320 may include a plurality of resources 314, required for processing a plurality of requests received such as a low priority request 304 and a high priority request 302. The input module 318, is configured to receive the low priority request 304, and the high priority request 302. The computing engine 306, can be configured to compute a violation risk factor of a set of low priority requests. The energy utilization engine 308, shall be configured to evaluate a utilization factor of a set of activated resources 322, of the data center 320; and the fuzzy engine 312, shall be configured to provision, according to a predefined rule base, one or more of the plurality of resources 314, for the received high priority request 302. The set of activated resources 322, can be utilized by a set of allocated requests to the data center 320. The allocating module 310, is configured to allocate one or more resources from the set of activated resources 322, to the received low priority request 304, when the one or more resources is available. Further, the allocating module 310, shall be configured to allocate one or more resources from the plurality of resources 314, to the high priority request 302, based on an input from the fuzzy engine 312.

The computing engine 306, shall be further configured to compute the violation risk factor by determining a ratio of; of an average waiting time of a low priority request and a product of an average duration of the set of low priority requests and a waiting factor. The energy utilization engine 308, shall evaluate the utilization factor as a ratio of a total load on the data center by the set of allocated requests and a product of a latest completion time of the set of allocated requests and a number of the set of activated resources. The computed violation risk factor and the evaluated utilization factor shall be provided as fuzzy inputs to the fuzzy engine. The predefined rule base of the fuzzy engine shall define performing one or more of; a) preempting a set of virtual machines utilizing a subset 316, of the set of activated resources 322, whereby the set of virtual machines is associated with the set of low priority requests; b) activating a new set of resources; and c) consolidating a plurality of virtual machines, based on the computed violation risk factor and the evaluated utilization factor. A decision made by the fuzzy engine 312 shall be provided as an input to the allocating module 310. The allocating module 310, shall allocate the resources from the plurality of resources 314, based on the decision of the fuzzy engine 312 of performing one or more of step a) step b) and step c). The predefined rule base as depicted in FIG. 4 shall contain a set of 20 rules based on the fuzzy sets of the computed violation risk factor and the evaluated utilization factor.

Figure 5:
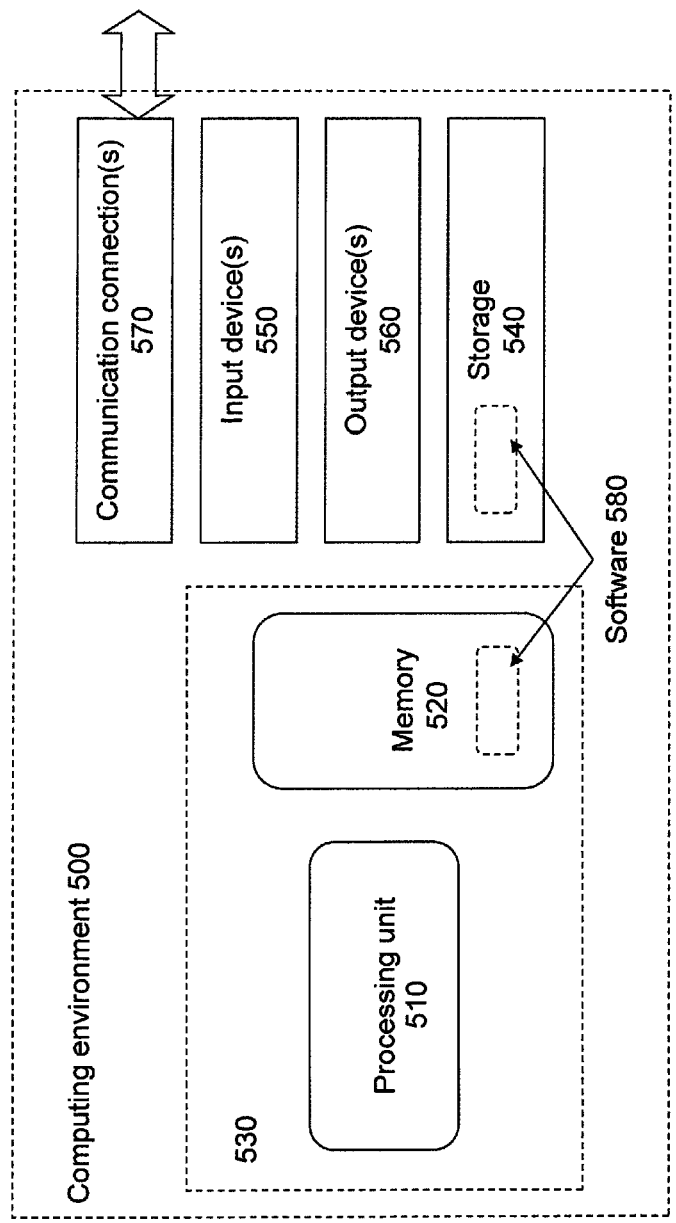
FIG. 5 illustrates a generalized example of a computing environment 500.

One or more of the above-described techniques can be implemented in or involve one or more computer systems. FIG. 5 illustrates a generalized example of a computing environment 500. The computing environment 500 is not intended to suggest any limitation as to scope of use or functionality of described embodiments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. In some embodiments, the memory 520 stores software 580 implementing described techniques.

A computing environment may have additional features. For example, the computing environment 500 includes storage 540, one or more input devices 540, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. In some embodiments, the storage 540 stores instructions for the software 580.

The input device(s) 550 may be a touch input device such as a keyboard, mouse, pen, trackball, touch screen, or game controller, a voice input device, a scanning device, a digital camera, or another device that provides input to the computing environment 500. The output device(s) 560 may be a display, printer, speaker, or another device that provides output from the computing environment 500.

The communication connection(s) 570 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 500, computer-readable media include memory 520, storage 540, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

We claim:

1. A method for provisioning a plurality of resources of a data center, the method comprising:
   computing a violation risk factor for a set of low priority requests, wherein the violation risk factor is a risk of violating a maximum average waiting time for the set of low priority requests;
   evaluating a utilization factor of an activated set of the plurality of resources of the data center; and
   provisioning, according to a predefined rule base comprising a plurality of rules that incorporate the violation risk factor for the set of low priority requests and the utilization factor of the activated set of the plurality of resources of the data center, one or more of the plurality of resources for a high priority request, wherein the predefined rule base switches among (a), (b), (c), and one or more combinations thereof based on the violation risk factor for the set of low priority requests and the utilization factor of the activated set of the plurality of resources of the data center:
   a) preempting one or more virtual machines of a set of virtual machines, wherein the one or more virtual machines are utilizing a subset of the activated set of the plurality of resources of the data center, wherein the one or more virtual machines are associated with the set of low priority requests;
   b) activating a new set of the plurality of resources of the data center;
   c) consolidating two or more virtual machines of the set of virtual machines;
   wherein the provisioning is based on the computed violation risk factor for the set of low priority requests and the evaluated utilization factor.

2. The method of claim 1, wherein the violation risk factor includes a risk of violating a service level agreement of the set of low priority requests.

3. The method of claim 1, wherein provisioning is performed on receiving the high priority request.

4. The method of claim 1, further comprising:
receiving a new low priority request; and
allocating one or more resources from the activated set of the plurality of resources of the data center to the received new low priority request, when the one or more resources is available.

5. The method of claim 1, wherein:
the violation risk factor is a ratio of an average waiting time of the set of low priority requests and a product of an average duration of the set of low priority requests and a waiting factor.

6. The method of claim 1, wherein the activated set of the plurality of resources of the data center are utilized by a set of allocated requests to the data center.

7. The method of claim 6, wherein the utilization factor is a ratio of a total load on the data center by the set of allocated requests and a product of a latest completion time of the set of allocated requests and a number of the activated set of the plurality of resources.

8. The method of claim 1, wherein:
a value of the violation risk factor ranges from a zero value to a positive value, wherein the zero value indicates a low risk of violating a maximum average waiting time and a value equal to and greater than one indicates a high risk of violating the maximum average waiting time; and
a value of the utilization factor ranges from a zero value to one, wherein the zero value indicates an under-utilization of the activated set of the plurality of resources of the data center, and the one indicates an over utilization of the activated set of the plurality of resources of the data center.

9. The method of claim 8, wherein:
the value of the violation risk factor is classified into one selected from the group consisting of: a low risk range, a medium risk range, a high risk range and a very high risk range; and
the value of the utilization factor is classified into one selected from the group consisting of: a very low, a low, a medium, a high and a very high.

10. The method of claim 9,
wherein the low risk range varies from 0 to 0.25, the medium risk range varies from 0.25 to 0.5, the high risk range varies from 0.5 to 0.75 and the very high risk range includes a value greater than 0.75.

11. The method of claim 10, wherein the very low includes a value from 0 to 0.4, the low includes a value from 0.2 to 0.5, the medium includes a value from 0.4 to 0.8, the high includes a value from 0.5 to 0.9, and the very high includes a value from 0.8 to 1.0.

12. The method of claim 11, wherein the predefined rule base comprises:
performing a), when the utilization factor is greater than 0.8 and the violation risk factor ranges from zero to 0.5;
performing b), when the violation risk factor is greater than 0.5 and the utilization factor is greater than 0.4;
performing c), when the utilization factor ranges from zero to 0.9, and the violation risk factor ranges from zero to 0.75;
performing a combination of step a) and step b), when the violation risk factor is greater than 0.25 and the utilization factor lies between zero and one; and
performing a combination of step a) and step c), when the violation risk factor is lesser than 0.75 and the utilization factor ranges from 0.2 to 1.

13. A system for provisioning a plurality of resources of a data center, the system comprising:
one or more processors;
a computing engine, configured to compute a violation risk factor of a set of low priority requests, wherein the violation risk factor is a risk of violating a maximum average waiting time for the set of low priority requests;
an energy utilization engine, configured to evaluate a utilization factor of an activated set of the plurality of resources of the data center; and
a fuzzy engine configured to provision, according to a predefined rule base comprising a plurality of rules that incorporate the violation risk factor for the set of low priority requests and the utilization factor of the activated set of the plurality of resources of the data center, one or more of the plurality of resources for a high priority request, the predefined rule base switching among (a), (b), (c), and one or more combinations thereof based on the violation risk factor for the set of low priority requests and the utilization factor of the activated set of the plurality of resources of the data center:
a) preempting one or more virtual machines of a set of virtual machines, wherein the one or more virtual machines are utilizing a subset of the activated set of the plurality of resources of the data center, wherein the one or more virtual machines are associated with the set of low priority requests;
b) activating a new set of the plurality of resources of the data center; and
c) consolidating two or more of the set of virtual machines;
wherein the provisioning is based on the computed violation risk factor and the evaluated utilization factor.

14. The system of claim 13, further comprising an input module, configured to receive the high priority request.

15. The system of claim 14, wherein the fuzzy engine is further configured to:
provision the one or more of the plurality of resources when the high priority request is received; and
receive the computed violation risk factor and the evaluated utilization factor as inputs for applying the rule base.

16. The system of claim 14, wherein the input module is further configured to receive a new low priority request.

17. The system of claim 16, wherein an allocating module is configured to allocate one or more resources from the activated set of the plurality of resources of the data center to the received new low priority request, when the one or more resources is available.

18. The system of claim 13, wherein the violation risk factor includes a risk of violating a service level agreement of the set of low priority requests.

19. The system of claim 18, wherein the computing engine is further configured to compute the violation risk factor by determining a ratio of an average waiting time of the low priority request and a product of an average duration of the set of low priority requests and a waiting factor.

20. The system of claim 13, wherein the activated set of the plurality of resources of the data center is utilized by a set of allocated requests to the data center.

21. The system of claim 20, wherein the utilization factor is a ratio of a total load on the data center by the set of allocated requests and a product of a latest completion time of the set of allocated requests and a number of the activated set of the plurality of resources of the data center.

22. The system of claim 13, wherein:
a value of the violation risk factor ranges from a zero value to a positive value, wherein the zero value indicates a low risk of violating a maximum average waiting time and a value equal to and greater than one indicates a high risk of violating the maximum average waiting time; and
a value of the utilization factor ranges from a zero value to one, wherein the zero value indicates an under-utilization of the activated set of the plurality of resources of the data center, and the one indicates an over utilization of the activated set of the plurality of resources of the data center.

23. The system of claim 22, wherein:
the value of the violation risk factor is classified into one of: a low risk range, a medium risk range, a high risk range and a very high risk range; and
the value of the utilization factor is classified into one selected from the group consisting of: a very low, a low, a medium, a high and a very high.

24. The system of claim 23, wherein the low risk range varies from 0 to 0.25, the medium risk range varies from 0.25 to 0.5, the high risk range varies from 0.5 to 0.75 and the very high risk range includes a value greater than 0.75.

25. The system of claim 24, wherein the very low includes a value from 0 to 0.4, the low includes a value from 0.2 to 0.5, the medium includes a value from 0.4 to 0.8, the high includes a value from 0.5 to 0.9, and the very high includes a value from 0.8 to 1.0.

26. The system of claim 25, wherein the predefined rule base comprises:
performing a), when the utilization factor is greater than 0.8 and the violation risk factor ranges from zero to 0.5,
performing b), when the violation risk factor is greater than 0.5 and the utilization factor is greater than 0.4,
performing c), when the utilization factor ranges from zero to 0.9, and the violation risk factor ranges from zero to 0.75, and
performing a combination comprising one of step a) and step b); or step a) and step c), when the violation risk factor is greater than 0.25 and the utilization factor lies between zero and one.

27. A computer program product comprising a plurality of program instructions stored on a non-transitory computer-readable medium that, when executed by a computing device, performs a method for provisioning a plurality of resources of a data center, the method comprising:
computing a violation risk factor for a set of low priority requests, wherein the violation risk factor comprises a risk of violating a maximum average waiting time for the set of low priority requests;
evaluating a utilization factor of an activated set of the plurality of resources of the data center; and
provisioning, according to a predefined rule base comprising a plurality of rules that incorporate the violation risk factor for the set of low priority requests and the utilization factor of the activated set of the plurality of resources of the data center, wherein the predefined rule base switches among (a), (b), (c), and one or more combinations thereof based on the violation risk factor for the set of low priority requests and the utilization factor of the activated set of the plurality of resources of the data center:
performing a first provisioning of one or more of the plurality of resources of the data center for a first high priority request according to a predefined rule base, wherein the first provisioning comprises preempting one or more virtual machines of a set of virtual machines, wherein the one or more virtual machines are utilizing a subset of the activated set of the plurality of resources of the data center, wherein the one or more virtual machines are associated with the set of low priority requests, further wherein the first provisioning is based on the computed violation risk factor and the evaluated utilization factor;
(b) performing a second provisioning of one or more of the plurality of resources of the data center for a second high priority request according to the predefined rule base, wherein the second provisioning comprises activating a new set of the plurality of resources of the data center, further wherein the second provisioning is based on the computed violation risk factor and the evaluated utilization factor; and
(c) performing a third provisioning of one or more of the plurality of resources of the data center for a third high priority request according to the predefined rule base, wherein the third provisioning comprises consolidating two or more of the set of virtual machines, further wherein the third provisioning is based on the computed violation risk factor and the evaluated utilization factor.

28. A method for provisioning a plurality of resources of a data center, the method comprising:
computing a violation risk factor for a set of low priority requests, wherein a value of the violation risk factor ranges from a zero value to a positive value, wherein the zero value indicates a low risk of violating the maximum average waiting time and a value equal to and greater than one indicates a high risk of violating the maximum average waiting time, wherein the value of the violation risk factor is classified into one selected from the group consisting of: a low risk range, a medium risk range, a high risk range and a very high risk range, further wherein the low risk range varies from 0 to 0.25, the medium risk range varies from 0.25 to 0.5, the high risk range varies from 0.5 to 0.75 and the very high risk range includes a value greater than 0.75;
evaluating a utilization factor of an activated set of the plurality of resources of the data center, wherein a value of the utilization factor ranges from a zero value to one, wherein the zero value indicates an under-utilization of the activated set of the plurality of resources of the data center, and the one indicates an over utilization of the activated set of the plurality of resources of the data center, wherein the value of the utilization factor is classified into one selected from the group consisting of: a very low, a low, a medium, a high and a very high; and
provisioning, according to a predefined rule base, one or more of the plurality of resources for a high priority request, whereby the predefined rule base defines performing one or more of:
a) preempting one or more virtual machines of a set of virtual machines, wherein the one or more virtual machines are utilizing a subset of the activated set of the plurality of resources of the data center, whereby the one or more virtual machines are associated with the set of low priority requests;
b) activating a new set of the plurality of resources of the data center; or
c) consolidating two or more of the set of virtual machines, based on the computed violation risk factor and the evaluated utilization factor.

29. The method of claim 28, wherein: the very low includes a value from 0 to 0.4, the low includes a value from 0.2 to 0.5, the medium includes a value from 0.4 to 0.8, the high includes a value from 0.5 to 0.9, and the very high includes a value from 0.8 to 1.0.

* * * * *